United States Patent
Kupersmith et al.

[11] 3,863,158
[45] Jan. 28, 1975

[54] SYNTHETIC PHASOR GENERATOR

[75] Inventors: Bertram F. Kupersmith, Bloomfield; Clarence Casper, Jr., Windsor, both of Conn.

[73] Assignee: United Aircraft Corporation, East Hartford, Conn.

[22] Filed: June 4, 1973

[21] Appl. No.: 367,069

[52] U.S. Cl. .................... 328/14, 307/227, 328/27
[51] Int. Cl. ............................................. H03b 19/00
[58] Field of Search ........ 307/227, 261; 328/14, 27, 328/186

[56] References Cited
UNITED STATES PATENTS

| | | | |
|---|---|---|---|
| 3,215,860 | 11/1965 | Neumann | 307/227 |
| 3,491,282 | 1/1970 | Heinrich et al. | 307/261 X |
| 3,657,657 | 4/1972 | Jefferson | 307/227 X |

*Primary Examiner*—Martin H. Edlow
*Assistant Examiner*—B. P. Davis
*Attorney, Agent, or Firm*—M. P. Williams

[57] ABSTRACT

A stepped approximation of a sine wave is generated by operational amplifiers, having feedback resistors of a given magnitude, which are connected through successive input resistors to a signal representing the magnitude of the desired synthetic sinusoid by means of an electronic multiplexing switch which is advanced by clocking signals spaced one sixteenth of the period of the desired synthetic sinusoid so as to cause 16 steps spanning discrete angular fractions of the period of said sinusoid, the input resistors having magnitudes related to the given magnitudes of said feedback resistors by the sine of the accumulated angle of said angular fractions, in relation to the successive clock signals.

4 Claims, 3 Drawing Figures

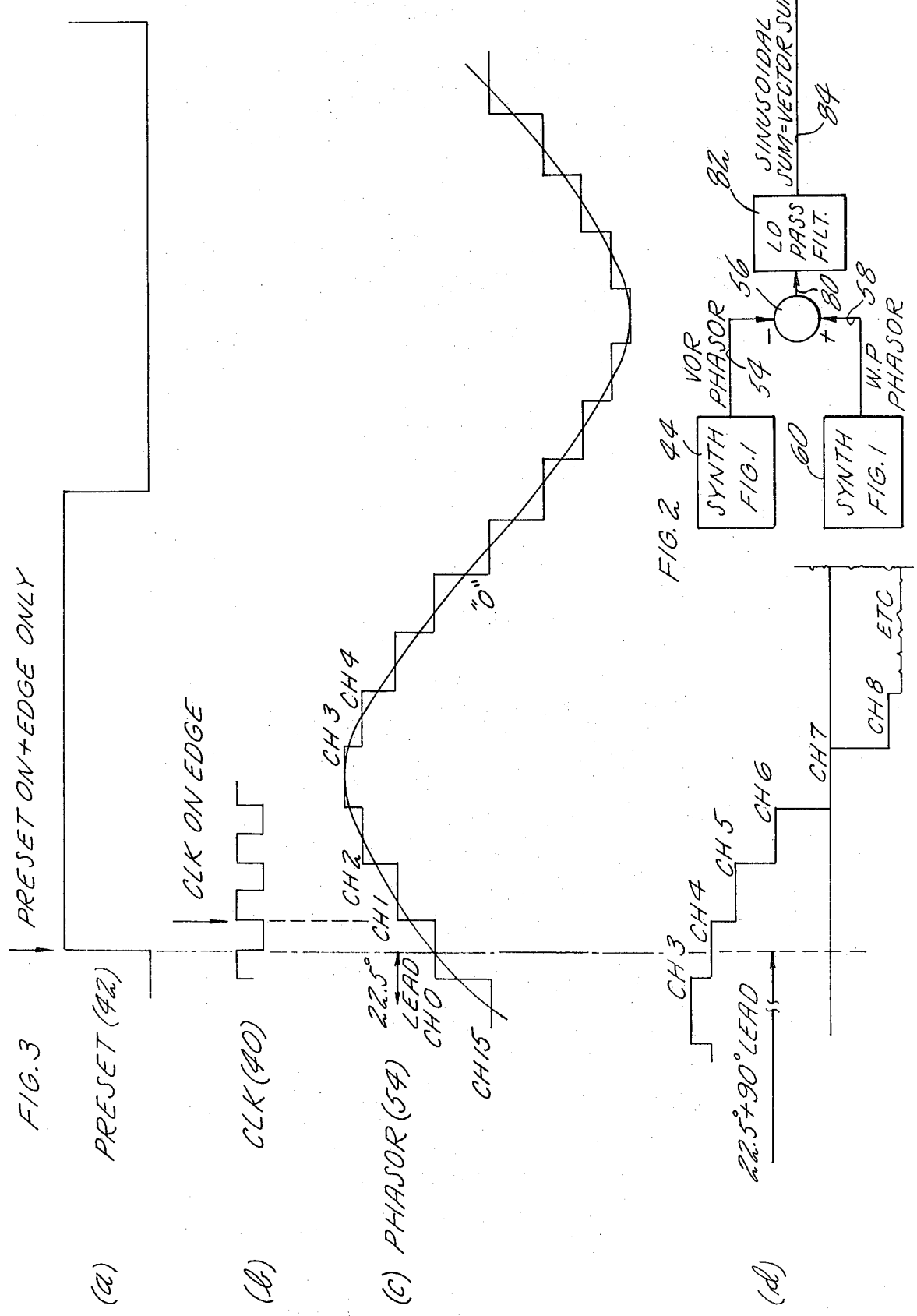

SYNTHETIC PHASOR GENERATOR

BACKGROUND OF THE INVENTION

1. Field of Invention

This invention relates to sine wave synthesis and more particularly to a synthetic phasor generator.

2. Description of the Prior Art

It is sometimes desirable to generate a sine wave in which the phase is very accurately timed with respect to the phase, or time or occurrence, of another signal, and in which the magnitude is readily controlled in a dynamic fashion. One such case is area navigation computers, an example of which is found in a commonly owned, copending application Ser. No. 367,070, filed on even date herewith by John E. Games and the inventors hereof.

Sinusoids have been synthesized in the prior art, in a manner which can fairly accurately control the phase thereof, by means of a shift register and a plurality of suitably weighted resistors. One such apparatus is shown in an article in Electronic Design News, Aug. 15, 1972. However, this method has several drawbacks. For instance, the sinusoid is composed by the addition of voltages provided by several stages, so that any errors in the resistance values are cumulative. Furthermore, one resistance is required for each fraction of the sine wave in the synthesization. In addition, there is no accommodation for the magnitude of the sine wave, such being controllable only by suitable multiplication means at the output of the synthesizer. In addition, the inherent opportunity for the generation of noise and other unwanted spurious components of the output signal may require the usage of a band pass filter in the output, which may introduce intolerable phase changes as a result of component shifts, in dependence upon the utilization to which the circuitry is put.

SUMMARY OF THE INVENTION

The object of the present invention is to provide an improved phasor synthesizer.

According to the present invention, cyclically operated electronic switch means is utilized to connect an input signal to operational amplifier means having feedback, through different resistance values which are so related to the feedback resistance as to cause the gain of the operational amplifier means to vary according to the sine of the angle related to the portion of time within which the related resistance is connected through said switching means to the input of the operational amplifier means.

Further in accord with the present invention, electronic switching means may comprise one or more binary controlled or addressed multiplex switches operated in response to a counter which is incremented by a timing singal having a period which is a stated faction of the period of the sinusoid to be synthesized. Thus, each fraction of the period relates to an angle, and the synthesizer produces an output voltage which relates to the sine of the angle at which the period is centered. The magnitude of the sinusoid is controlled by the signal applied to the various input resistors. In still further accord with the present invention, two multiplexing switches are used, one for each half sine wave to be synthesized, the output of one of them being inverted; in specific accord with this aspect of the invention, inversion is provided by passing the output of one operational amplifier (which generates the signal during one half of the sinusoid) through an inverting input of another operational amplifier (which generates the stepped output signal during other portion of the sinusoid), thereby to invert the output during one half the sinusoid.

The present invention provides an extremely accurate phase relationship with respect to a sine wave and other signals to which it relates. The present invention permits the production of a synthesized sine wave, the magnitude of which is easily related to any desired incoming signal. The present invention provides substantially pure sinusoidal outputs; since the harmonic content is low and includes no harmonics below the 15th; therefore, a low pass filter may be used to smooth the output to provide a substantially pure sinusoid, thereby obviating the increased phase distortion which may occur as a result of the use of band pass filters which may shift substantially due to component variances. The invention is easily implemented utilizing standard components which are readily available in the marketplace.

Other objects, features and advantages of the present invention will become more apparent in the light of the following detailed description of a preferred embodiment thereof, as illustrated in the accompanying drawing.

BRIEF DESCRIPTION OF THE DRAWING

FIG. 2 is a partial, simplified schematic diagram of the utilization of the invention with vector summation and filtering means; and FIG. 3 is a composite illustration on a common time base of signals relating to the embodiment of FIG. 1.

DESCRIPTION OF THE PREFERRED EMBODIMENT

Figure 1:
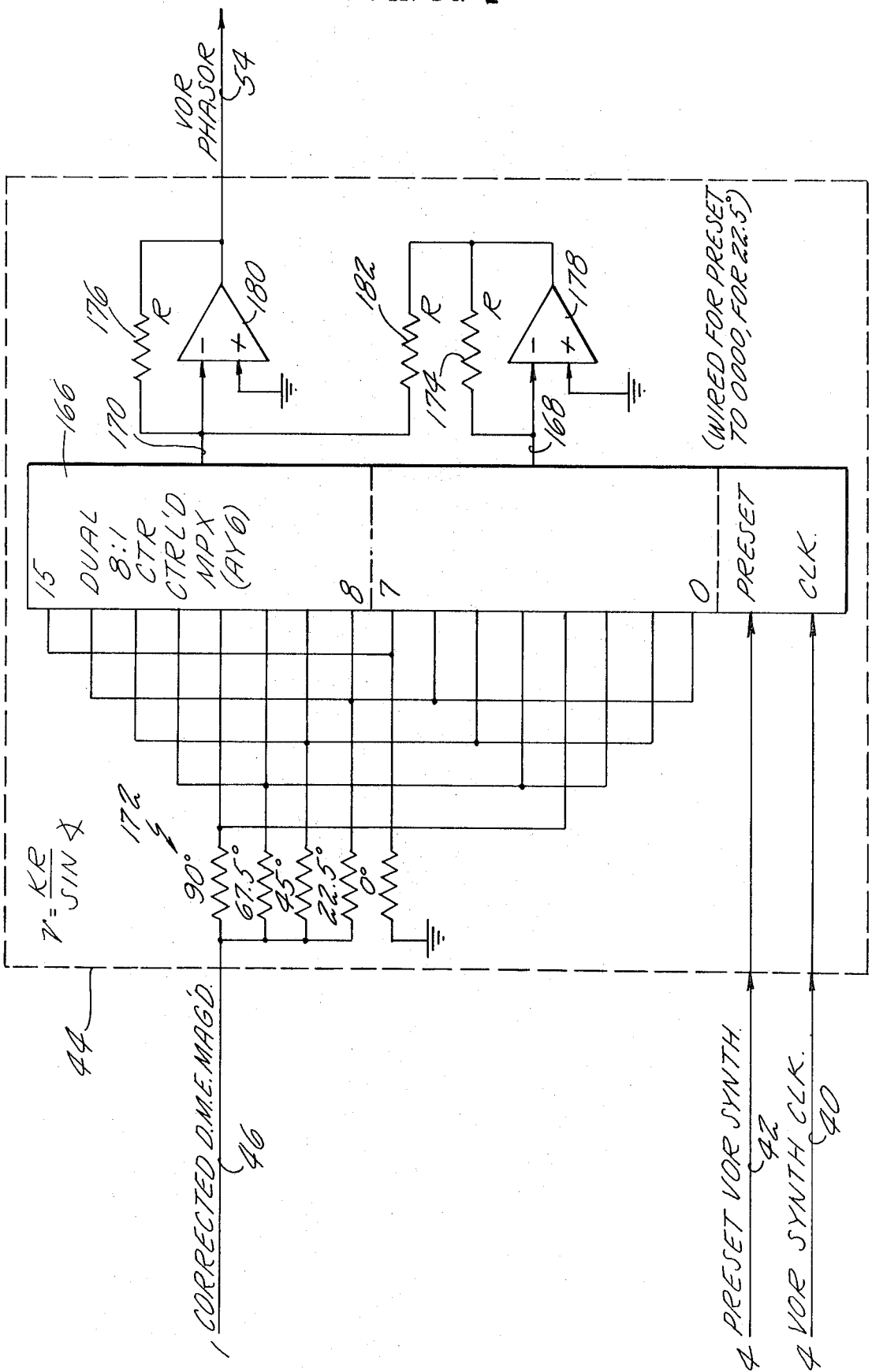
FIG. 1 is a simplified schematic block diagram of a preferred embodiment of the present invention.

The embodiment of the present invention disclosed herein is disclosed in an area navigation computer in the aforementioned copending application. The reference numerals herein correspond with the reference numerals utilized in the aforementioned copending application for like portions of the embodiment herein.

Briefly described, the preferred embodiment utilizes a multiplex switch which is advanced by a counter in in response to timing signals so as to connect successive input resistances to either of two operational amplifiers, the resistances varying with the sine of the angle corresponding with the portion of the cycle in which the particular input is connected to the operational amplifiers, so that the gains of the operational amplifiers are commensurately equivalent to the sine of the angle during any portion of a cycle of the sinusoid to be synthesized. The timing signals for the embodiment herein are derived in FIGS. 1 and 4 of the aforementioned copending application, and are not shown in any further detail herein.

Referring now to FIGS. 1 and 3 the VOR phasor synthesizer 44 receives the slant range corrected distance signal on the line 46, the preset VOR synthesizer signal on the line 42, and the VOR synthesizer clock signal on the line 40, and produces the VOR phasor signal on the output 54. The synthesizer 44 comprises a dual 8:1, counter-controlled multiplex circuit 166, which most conveniently may comprise such a circuit provided in integrated circuit form by General Instruments under the designation AY6-4016, or other equivalent circuitry. The multiplex circuit 166 has a counter which is advanced by clock signals on the line 40; the counter is wired for preset so that any desired number can be established in the counter in response to the rising edge of the signal on the line 42. In the case of the VOR phasor synthesizer, the preset is set to 0000 so as to establish a 22.5° phase lead (as the device is connected), as can be seen with reference to illustration (c) of FIG. 3. The multiplexer 166 has two 8:1 sections, each capable of connecting any one of 8 channels to a related output 168, 170. Thus, as the counter rolls from 0 through 7, corresponding channels 0–7 are connected in turn on the output 168, and as the counter rolls from 8–15, it connects respective channels 8–15 to the output 170. Each of the channels is connected to a particular one of several input resistors 172, the resistance of which is related to the resistance, R, of feedback resistors 174, 176 so as to provide gains to operational amplifiers 178, 180 which relate to the sine of the increments of a cycle at 30 Hz, as illustrated in FIG. 3. That is, each of the resistors 172 has a resistance value which is some constant times the value of the resistors 174, 176 divided by the sine of the appropriate angle. Thus, the magnitude of the output of the synthesizer on the line 54 at 90° (plus 22 ½° lead) will be proportional to the magnitude of the corrected distance signal on the line 46. At other angles, the output magnitude is appropriately diminished so as to synthesize the sine wave in stepped fashion as shown in illustration (c) of FIG. 3. As shown in illustration (c), by presetting the counter for an allzeros condition, and causing channel zero to be equivalent to 22.5°, a 22.5° phase lead is achieved. This is utilized to offset a 22.5° phase lag provided by the low pass filter 82 (FIG. 2) through which the output of the phasor synthesizers 44, 60 is applied. Because the first half of the sine wave is positive and the second half is negative, and due to the inversion provided by the amplifiers 178, 180, the output of the amplifier 178 is passed through a resistor 182 to the inverting input of the amplifier 180 so that the voltages provided by channels 0–7 at the lead 168 are applied in a positive fashion (double inversion) on the VOR phasor output line 54, whereas the voltages from channels 8–15 are only inverted once and are applied in a negative fashion to the VOR phasor line 54.

Illustrations (a) and (b) of FIG. 3 illustrate the importance of the relationship between the preset signal on the line 42 and the clock signal on the line 40. The counter is preset in response to the positive edge of the preset signal, and is clocked on the positive edge of the clock signal. Thus the preset, in a sense, falls in the middle of one of the steps of the sine wave, and the filtered output of the sine wave is essentially that illustrated by the solid line drawn through the center of the steps in illustration (c) of FIG. 3. Since the preset is generated (in said copending application) as a countdown from the 122.88 KHz north signal as synchronized with the 30 Hz variable signal, the sine wave generated in the VOR synthesizer is generated with a phase relating to the phase of the 30 Hz variable signal (and therefore the bearing of the aircraft to the VOR ground station) to something on the order of one-tenth of a degree. Similarly, because of the accuracy inherent in the operational amplifiers 178, 180 and in the input resistors, the magnitude of the synthesized phasor sine wave will very accurately reflect the distance to the VOR station (or other signal on the line 46). The line 46 thus acts as a means for receiving any signal relating to the desired magnitude of the sinusoid.

The waypoint phasor synthesizer 60 may be identical to the VOR phasor synthesizer 44. Because the multiplexor 166 (FIG. 1) has a 16 bit counter, and will receive 16 clock pulses on the signal line 40, it will advance through maximum setting back to zero and need not be preset in every cycle. In the worst case, if the preset is changed during a 30 Hz cycle, the change may not be effected until the second subsequent 30 Hz cycle, which is totally insignificant in the navigation of an aircraft and in many other applications.

As described briefly hereinbefore, the output of the VOR phasor synthesizer 44 on line 54 may represent the vector from a VOR station to an aircraft, and the output of the waypoint synthesizer 60 on a line 58 may represent a vector from a VOR station to a waypoint. Subtraction of the aircraft vector from the waypoint vector (FIG. 2) produces a vector from the aircraft to the waypoint, which is represented by the phasor on the signal line 80 at the output of a summing amplifier 56.

One significant aspect of the present invention is that the utilization of synthetic phasor generators of the present invention produces substantially pure sinusoidal waves. This is due to the fact that there is substantially no harmonic content from the fundamental until the 15th harmonic, which contains only 6 percent of the fundamental; and the 17th contains 5 percent of the fundamental, the 31st contains 3 percent and the 33rd harmonic contains about 3 percent. In other words, any sort of low pass filtering results in a substantially pure sinusoid. Further, addition of the two stepped waves (FIG 2), even though they are out of phase, is relatively immaterial because of the extremely low harmonic content, and the extreme high frequency of the harmonic content. Thus, this aspect of the present invention permits utilization of a simple low pass filter 82, rather than a relatively high Q band pass filter as is required in vector summation or phasor addition devices known to the art. Further, since the frequencies involved are not very critical, it is possible to pick up upper breakpoint frequency of the low pass filter 82 which is easily compensated for by introducing a phase lead in the phasor synthesizers 44, 60. Specifically, utilization of a double breakpoint around 100 Hz results in a phase lag of about 22.5°, which is accomodated as described hereinbefore by causing the all-zero condition to represent the first step of the sine wave (22.5°).

Although the invention has been shown and described with respect to a preferred embodiment thereof, which is illustrated as it may be utilized in an area navigation computer as shown in the aforementioned copending application it should be understood by those skilled in the art that various changes and omissions in the form and detail thereof may be made therein without departing from the spirit and the scope of the invention.

Having thus described a typical embodiment of our invention, that which we claim as new and desire to secure by Letters Patent of the United States is:

1. A synthetic phasor generator comprising:
   clock means providing a sequence of cyclic timing signals each having a period which is a small fraction of the period of a sinusoid to be synthesized;
   operational amplifier means having feedback resistance of a given magnitude;

electronic switching means having a plurality of inputs, said switching means connected to said clock means and operable in response to said timing signals to connect said operational amplifier means to successive, selected ones of said inputs, one at a time, in successive ones of the fractions of the period of the sinusoid to be synthesized;

signal receiving means for receiving a signal relating to the desired magnitude of the sinusoid to be generated; and a plurality of input resistances, each connected between the related one of said switching means inputs and said signal receiving means, each having a magnitude of said feed-back resistance of said operational amplifier related to the given magnitude by the sine of the angle corresponding to the fraction of the period of said sinusoid within which the related one of said switching means inputs is connected to said operational amplifier means.

2. A synthetic phasor generator according to claim 1 wherein said electronic switch means comprises a binary selected multiplex switch and a binary counter, said counter connected to said clock means for advancement by said timing signals, said counter having a maximum count equal to the number of said timing signals in one period of the sinusoid to be synthesized.

3. A synthetic phasor generator according to claim 1 wherein said operational amplifier means comprises two operational amplifiers, each having a feedback resistor having a resistance of said given magnitude, and said electronic switching means comprises two sets of inputs and is operable to connect a first one of said sets to a first one of said operational amplifiers during one half of the period of the sinusoid and is operable to connect the second set to the second one of said operational amplifiers during the second half of the period of the sinusoid, said operational amplifier means providing the output of said first operational amplifier without inversion and inverting the output of said second operational amplifier, thereby to provide the two halves of the synthesized sinusoid with mutually opposite sense.

4. A synthetic phasor generator according to claim 3 wherein the output of said second operational amplifier is connected through a resistance of said given magnitude to an inverting input of said first operational amplifier.

* * * * *